United States Patent Office 3,448,239
Patented June 3, 1969

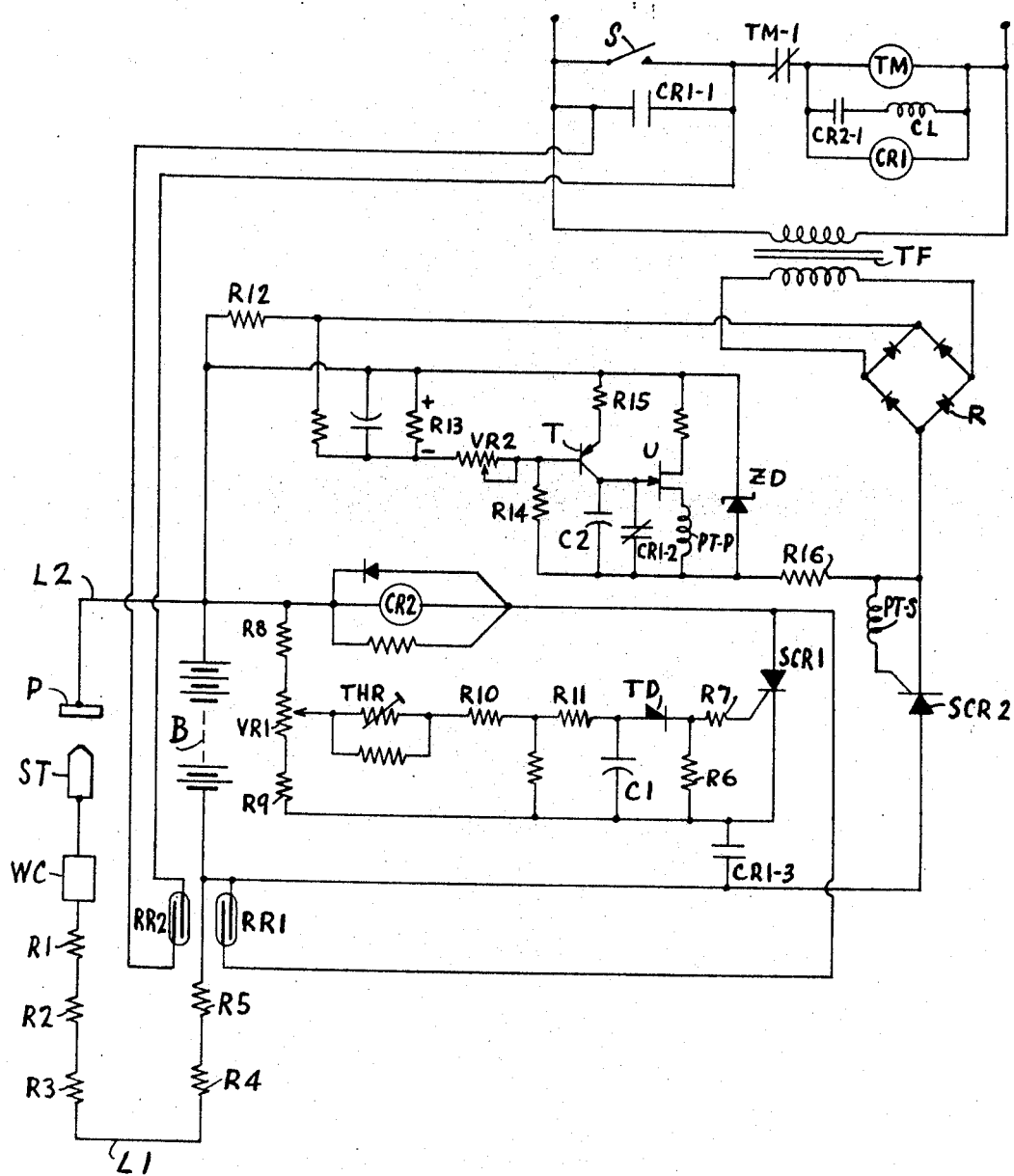

3,448,239
BATTERY CHARGING CIRCUIT
Arthur Hill, North Olmsted, Ohio, assignor to Gregory Industries, Inc., Lorain, Ohio, a corporation of Michigan
Filed Apr. 6, 1966, Ser. No. 540,760
Int. Cl. B23k 9/10, 11/24
U.S. Cl. 219—108                                2 Claims

ABSTRACT OF THE DISCLOSURE

A battery charging circuit is provided in which a battery is charged until it reaches a predetermined voltage, after which charging is continued for a predetermined period of time. The charging current for the predetermined period is maintained at a constant rate even though the charge on the battery continues to increase. This increases the charging effectiveness of the circuit in contrast to the usual charging circuit in which the charging current drops as the battery charge increases. The battery charging circuit also has a unique reset feature. With this arrangement, a timer controlling the time for the charging current will begin to time out the final full period of constant charging only after the last use of the battery.

---

This invention relates to a battery charging circuit and more particularly to means for effectively controlling charging of a bank of batteries employed as the power source in stud welding.

Proper charging of a battery is difficult to achieve. The battery cannot simply be charged to a point where a predetermined voltage across the terminals is reached because a fully charged battery depends on other factors in addition to the voltage. The voltage reading of a battery is affected by the age and condition of the cells, the level of stored energy in the cells, the rate of charging, and the electrolyte temperature. Further, if the terminal voltage is measured when the battery is not being charged, the voltage may decay rapidly, in an exponential manner. Consequently, a voltage reading is not a reliable indicator of the state of charge of the battery.

It has been found that batteries can be more effectively charged by charging them to a predetermined terminal voltage and by then providing an additional charge at a constant rate of current for a predetermined period of time. The voltage across the terminals at which the last charge should begin will vary for the age and condition of the cells. It has been found, however, that by using a compromise or average voltage, satisfactory results can be achieved for both new and older batteries. The voltage also should be compensated for electrolyte temperature which otherwise has a considerable affect on the charging rate.

The charging means embodying the invention has been found to be particularly advantageous for charging banks of batteries used as the power source for stud welding equipment. When employing stud welding in various types of construction jobs in the field, often the only source of power, if any power at all, is the usual 110 volt A.C. source. In such instances, a bank of batteries is often employed on a portable cart, which battery bank supplies the main source of power for the welding equipment. The batteries usually are charged continuously during the welding operation from the 110 volt source, if available, but, in any event, the batteries are charged when not being used.

It is, therefore, a principal object of the invention to provide improved means for more effectively charging batteries to achieve longer life and reliability.

Various other objects and advantages will be apparent from the following detailed description of a preferred embodiment thereof, reference being made to the accompanying drawing, in which:

The single figure is a diagrammatic view of a battery charging circuit embodying the invention.

In charging a battery or a bank of batteries according to the invention, charging current is supplied at a fixed rate preferably until the voltage across the battery reaches a predetermined amount that represents about eighty percent of a fully charged battery. At this point, a final charge at constant current, preferably the same current as before, is applied for a predetermined period, causing the battery to attain its full charge. By way of example, twelve three-cell batteries rated at 140 ampere-hours are designed to be charged over a twenty hour period with a charging current of 7 amperes. These batteries will reach eighty percent of their full charge at a voltage from 80–92 volts, depending upon their age. In such an instance, the batteries are charged at the constant current for the predetermined period after the reading across the terminals reaches 85 volts, representing an average for old and new cells. Rather than employing a 7 ampere-charging current in this instance, 6 amperes are used for a maximum period of twenty-four hours, which provides adequate time and results in less heat. In such an instance, the battery reading will reach a value of 85 volts at 78° F. across the terminals within about twenty hours, after which a constant 6-ampere charge is applied for four hours.

The bank of batteries can be carried on a suitable cart or other vehicle such as a truck to a point where the welding equipment is to be used. If an independent power source is available, it can be used to charge the batteries during the welding operations, or the cart can be taken to the power source after a number of welds have been made and the batteries have been partially discharged to the point where the output voltage is no longer suitable for a proper weld.

Referring to the drawing, batteries B constitute a source of power for welding and are connected through cables or lines L1 and L2 to a stud ST and a workpiece P. Suitable welding control circuitry designated WC controls the movement of the stud relative to the workpiece and the welding arc established therebetween, as is well known in the art. A load in the form of resistors R1–R5 are in series with the stud ST in the line L1 to apply an appropriate load in order to establish a proper welding arc between the stud and the workpiece. Smaller studs require less current so that more of the resistors are incorporated into the circuit. Similarly, larger studs require heavier welding current so that fewer resistors are then used.

When it is desired to charge the bank of batteries B, a switch S is closed to energize a control relay CR1 causing its contacts CR1–1 across the switch S to close and thereby hold in the relay. At the same time, the relay CR1 causes its contacts CR1–2 to open to enable a unijunction transistor U of a current regulating portion of the circuit to operate. The relay CR1 also closes contacts CR1–3 to connect a voltage sensing portion of the circuit across the battery terminals. A charge on a capacitor C1 is developed which is proportional to the voltage across the batteries. When the voltage becomes sufficiently large, the capacitor discharges through a tunnel diode TD and across a resistance R6, keying a silicon controlled rectifier SCR1 by voltage applied to the gate through a resistor R7. The voltage across the capacitor C1 depends on a voltage divider comprising resistors R8 and R9, a variable resistor VR1, a thermistor THR, and resistors R10 and R11. The resistance of the thermistor THR varies with the temperature, decreasing as the temperature increases and increasing as the temperature decreases. This enables the voltage sensing circuitry to also be temperature sensitive, which is important since the temperature of the battery electrolyte affects the cell voltages. The thermistor adjustment of the voltage pickup prevents undercharging if the temperature is low and overcharging if the temperature is high. Preferably, the capacitor C1 will key the rectifier SCR1 when the voltage across the batteries reaches about eighty percent of its charge. For example, the rectifier will be keyed when the voltage is 85 volts at 78° F., equivalent to 99 volts at 50° F.

When the rectifier SCR1 is keyed, a low voltage relay CR2 is connected across the battery terminals and is energized. The relay CR2 closes contacts CR2–1 to energize a clutch CL of a timer TM located in series with the switch S. This causes the timer to begin to time out for a predetermined period, such as four hours. When the timer times out, it temporarily opens contacts TM–1 to cause the relay CR1 to drop out and the charging circuitry to be shut off. Consequently, when the voltage across the batteries B has reached a charge sufficient to key the rectifier SCR1 and energize the relay CR2, the batteries will then be charged for a final four hours beginning at the time the clutch CL is energized.

If the batteries are being used in a welding process, the timer will not begin to time out until after the last weld is completed. This is accomplished through a reed relay RR1 which is located adjacent the cable L1 and senses the magnetic field around the cable when welding current is flowing through. In the event that welding is taking place with heavy welding current flowing through the lines L1 and L2, the reed relay will be caused to close and thereby short circuit the rectifier SCR1, and cause it to turn off. This causes the relay CR2 to drop out and the timer to reset when the weld is completed. The timer will then start to time out again when the rectifier SCR1 is keyed once more. An additional reed relay RR2 is provided as alternaate means for initiating charging again by energizing the relay CR1 if welding is started after a charging cycle has been completed. If no welding is taking place, the relay CR2 will continue to remain energized through the rectifier SCR1 and the rectifier SCR1 will remain keyed until the timer TM has timed out and the contacts TM–1 have temporarily opened to deenergize the relay CR1.

The charging current is always maintained constant, as at 6 amperes, even though the charge on the batteries always is increasing and even though the line voltage may vary between 95 and 125 volts, for example. Referring to the current control portion of the circuit, the voltage drop across a resistor R12 depends on the charging current. With a Zener diode ZD and with proper values for resistors R13, R14, and VR2, a biased or reference voltage can be set at a resistor R15 for the input of a transistor T. This sets a bias level on a capacitor C2 which is charged at a predetermined rate, when the contacts CR1–2 of the relay CR1 are opened. When the capacitor C2 reaches a predetermined charge, it keys a unijunction transistor U and discharges across a primary PT–P of a pulse transformer. A secondary PT–S of the pulse transformer turns on a silicon controlled rectifier SCR2 which then places the charging current from a power source constituting a full wave rectifier R and transformer TF across the batteries. The batteries are then charged toward the end of each half wave cycle depending upon the phase delay caused by the pulsing of the pulse transformer and the charging of the capacitor C2. The faster the capacitor C2 charges, the earlier in the cycle the rectifier SCR2 will turn on so the charge across the batteries becomes higher as the capacitor C2 charges faster. The bias voltage at the resistor R15 tends to increase as the charge on the batteries increases, causing the capacitor C2 to charge faster and fire the rectifier SCR2 earlier. Also, when the charging current tends to increase, the voltage drop across the resistor R12 tends to increase, reducing the input at the resistor R15. This tends to cause the capacitor C2 to fire later and offset the tendency for increased charging current. In this manner, as the battery charge increases, the charging current tends to decrease but is maintained at the preset level as controlled by the variable resistor VR2.

A resistor R16 drops the line voltage, which may be 120 volts, to the Zener diode ZD, which may be 18 volts, by way of example.

To summarize the operation of the charging circuitry, the batteries are charged with a constant charging current until the terminal voltage reaches a predetermined value, at which time the constant current is applied for a predetermined period as determined by the timer TM. The charging current is maintained constant during both portions of the charging cycle by virtue of the resistor R12 and the transistor circuit.

Numerous modifications of the above described embodiment of the invention will be apparent to those skilled in the art and it is to be understood that such modifications can be made without departing from the scope of the invention, if they are within the spirit and the tenor of the accompanying claims.

I claim:

1. Charging means for charging a battery comprising a direct current power source, conductor means for connecting said power source with the terminals of the battery, timing means for controlling the time in which a charge is applied to the battery and means for maintaining the charge constant for all conditions of the battery, said timing means comprising means including temperature compensating means for sensing the voltage across the battery terminals, a timer, means for energizing said timer when the voltage across the terminals reaches a predetermined value compensated for temperature, said timer being effective to terminate charging when a predetermined period of time has elapsed, said charging control means comprising switch means in said conductor means between the power source and the battery, an impedance in said conductor means between said power source and the battery, means responsive to the voltage across said impedance to close said switch means when a predetermined voltage is reached, cable means connecting said battery with welding apparatus, a reed relay adjacent said cable means and sensitive to flow of current from said battery to said welding apparatus through said cable means for closing and resetting said timing means each time a weld is effected and welding current flows through said cable means after said terminal voltage reaches the predetermined value.

2. In welding apparatus in which welding current is supplied by a battery, charging means for charging the battery comprising a direct current power source, conductor means for connecting said power source with the terminals of the battery, timing means for controlling the time at which a charge is applied to the battery and means for maintaining the charge constant for all conditions of the battery, said timing means comprising means for sensing the voltage across the battery terminals, a timer, means for energizing said timer when the voltage across the terminals reaches a predetermined value, said timer being effective to terminate charging when a predetermined period of time has elapsed, said charging control means comprising a semiconductor controlled rectifier in said conductor means between the power source and the battery, an impedance in said conductor means between said power source and the battery, cable means connecting said battery with the welding apparatus, and a reed relay adjacent said cable means sensitive to flow of current from said battery to said welding apparatus through said cable means for resetting said timing means each time a weld is effected after said terminal voltage reaches the predetermined value by shorting out said semiconductor controlled rectifier and causing it to turn off.

(References on following page)

References Cited

UNITED STATES PATENTS

| | | | |
|---|---|---|---|
| 1,183,264 | 5/1916 | Woodrow | 219—108 |
| 1,538,588 | 5/1925 | Pohler | 320—28 |
| 2,354,877 | 8/1944 | Peters | 320—37 |
| 2,477,622 | 8/1949 | Klemperer | 219—113 |
| 2,650,339 | 8/1953 | Christie et al. | 320—31 |
| 2,883,579 | 4/1959 | Rockafellow | 219—114 |
| 3,081,426 | 3/1963 | Bakke | 320—38 |
| 3,106,665 | 10/1963 | Byles | 320—35 |
| 3,291,958 | 12/1963 | Glorioso | 219—113 |

RICHARD M. WOOD, *Primary Examiner.*

P. W. MAY, *Assistant Examiner.*

U.S. Cl. X.R.

219—86, 110; 320—35